Aug. 10, 1937. D. LEWIS ET AL Re. 20,466

ABRASIVE CUTTING MACHINE

Original Filed April 18, 1934 2 Sheets-Sheet 1

INVENTORS
DARTREY LEWIS,
WILFRID L. WALSH,
WALTER B. LASHAR, JR.

BY Frederick S. Lamb ATTORNEY

Aug. 10, 1937. D. LEWIS ET AL Re. 20,466

ABRASIVE CUTTING MACHINE

Original Filed April 18, 1934 2 Sheets-Sheet 2

INVENTORS
DARTREY LEWIS,
WILFRID L. WALSH,
WALTER B. LASHAR, JR.

BY Frederick S. Duncan ATTORNEY

Reissued Aug. 10, 1937 Re. 20,466

UNITED STATES PATENT OFFICE 20,466

ABRASIVE CUTTING MACHINE

Dartrey Lewis, Boston, and Wilfrid L. Walsh, Cambridge, Mass., and Walter B. Lashar, Jr., Fairfield, Conn., assignors to American Chain & Cable Company, Inc., Bridgeport, Conn., a corporation of New York Original No. 2,031,052, dated February 18, 1936, Serial No. 721,128, April 18, 1934. Application for reissue December 14, 1936, Serial No. 115,888

9 Claims. (Cl. 51—98)

This invention relates to an improved method and apparatus for cutting various substances, more particularly those of a brittle nature, although it is usefully applied to the cutting of any hard substance whether or not having the characteristic of brittleness, such as various steels and other metals, plastic compositions, hard rubber, etc. The invention involves, as its principal feature, the cutting of such materials while they are subject to the action of a stream of water or other suitable liquid as distinguished from other processes recently developed wherein they are submerged in a body of water. We are aware of the fact that it has already been found that, when cutting metals with a thin abrasive wheel, it is of great advantage to submerge the material in a liquid—more commonly water—the result of which is a smooth, clean cut with a substantially perfectly plane section without burrs on its edges and without any deleterious effects from burning or undue heating. We have found that, while submergence of the materials during cutting with wheels of the type above-mentioned is highly advantageous, there are many cases in which complete submergence or immersion can be dispensed with and a stream of water directed on the work in the region of cutting, provided such stream of water be of suitable volume and be properly directed and confined.

With the foregoing and other objects in view, the invention consists in a certain method and improved means for carrying out the method, as will be more clearly disclosed in connection with the accompanying drawings, but it is to be understood that we are not limited to the specific apparatus shown, it being quite feasible to carry out the method in various other apparatus.

Referring to the drawings.

Figure 1:
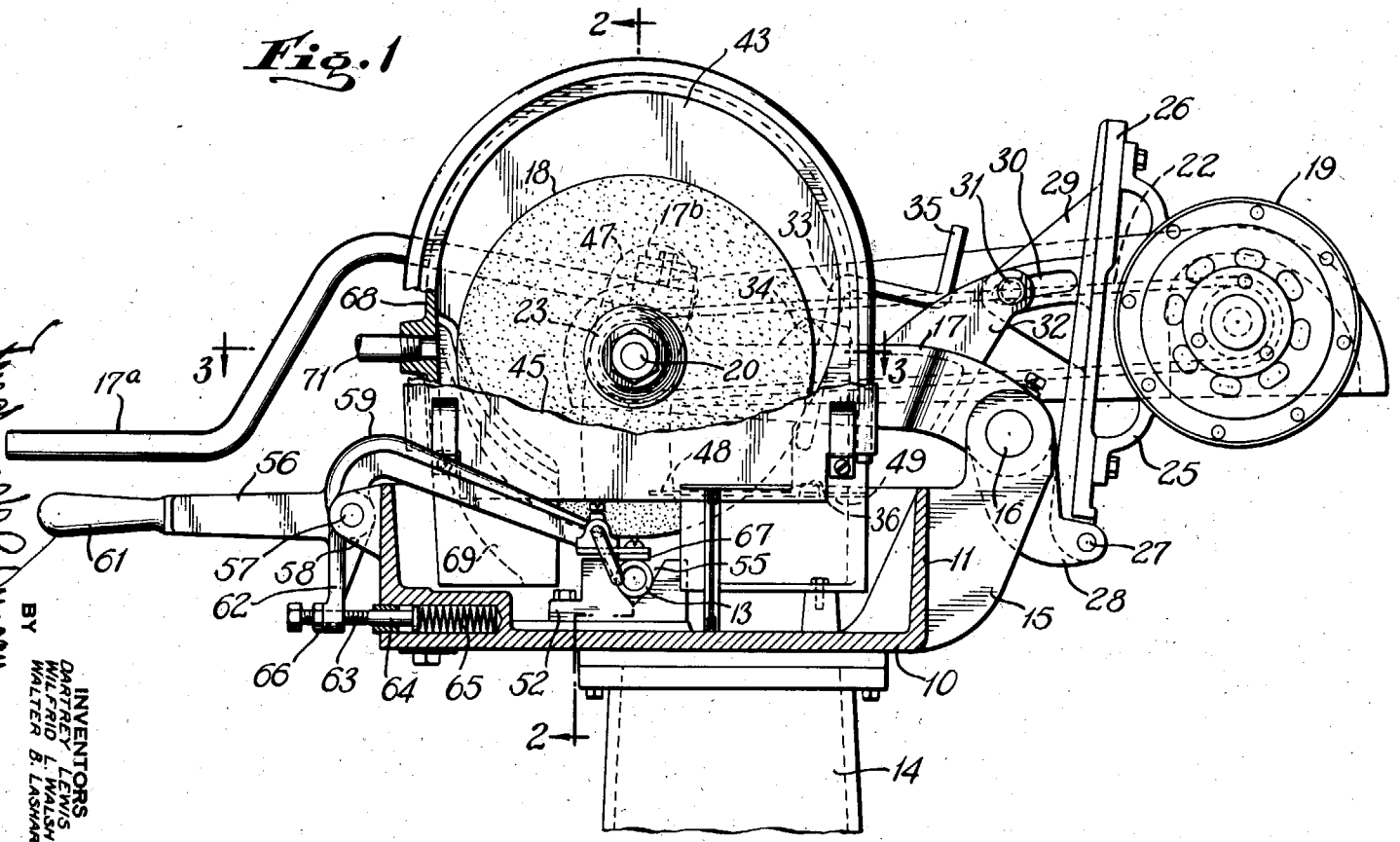
Fig. 1 is an elevation of the machine partly in section.
Figure 3:
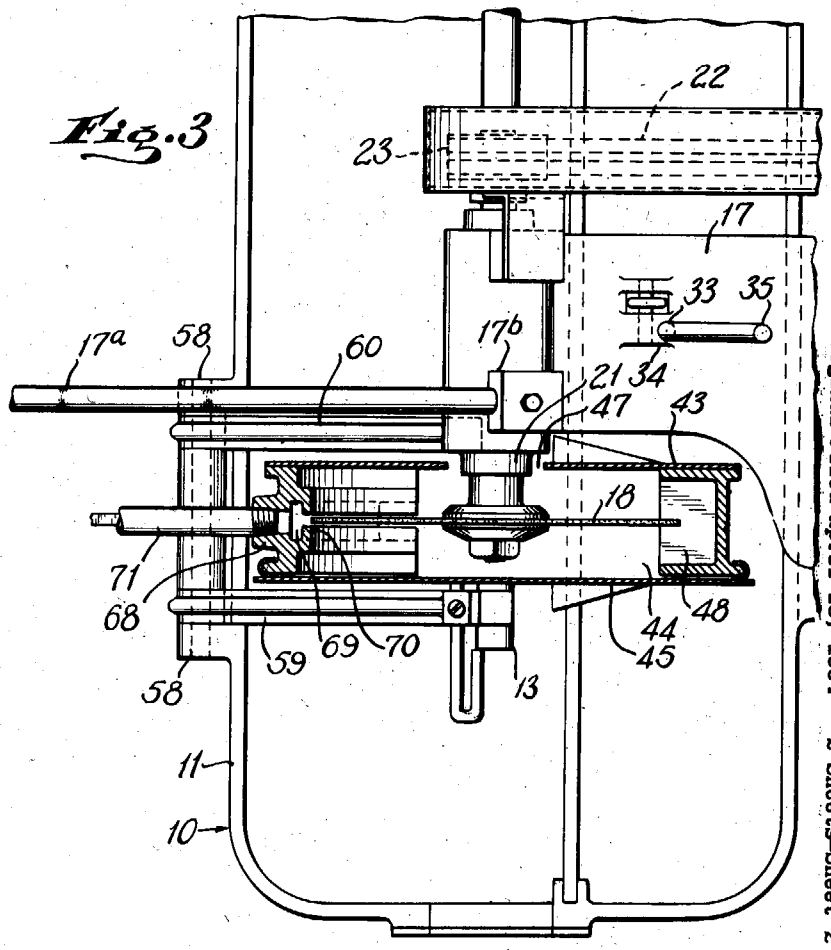
Fig. 3 is a plan view on the line 3—3 of Fig. 1.
Figure 2:
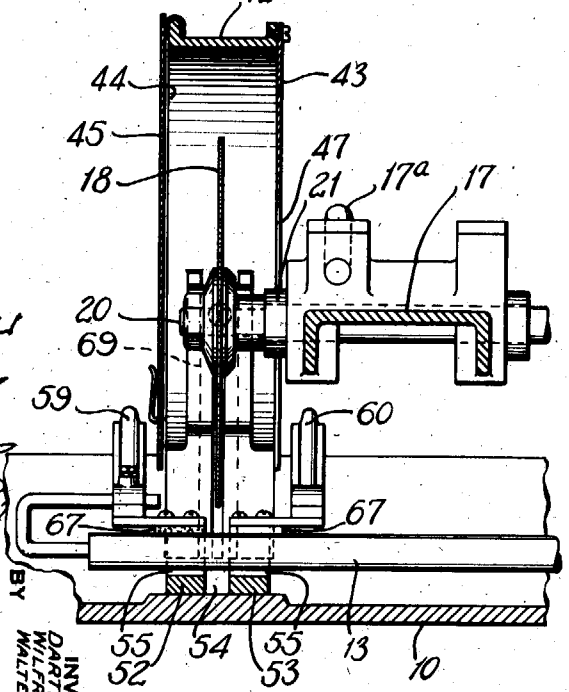
Fig. 2 is a view on the line 2—2 of Fig. 1.

These drawings show the embodiment of the invention in a machine which has proven very efficient in carrying out the process referred to. It comprises a bed 10 which may be provided with vertical peripheral walls 11 to form a reservoir or container for water or other liquid employed in the cutting operation, as will be hereinafter more particularly pointed out. This bed or container may be mounted on any suitable support such as the pedestal 14. The container may be provided with rearwardly extending brackets 15 on which may be pivotally mounted, as by a shaft 16, a frame 17 carrying the thin abrasive cutting wheel indicated at 18 and the power means for driving this wheel, such as an electric motor 19. In the present instance, the wheel is removably mounted on a shaft 20 running in bearings 21 in the frame 17 and is driven by a suitable flexible drive such as a V-belt drive 22 running over pulley 23 on the shaft 20 and also on a drive pulley (not shown) carried by the motor shaft in the usual manner. It is also preferred to provide means for adjusting the tightness of this belt drive, and, in the present instance, the motor is carried on a frame 25 secured to an upright bracket 26 pivoted in the frame 17 at 27 between arms 28. This bracket 26 also has a lug 29 provided with an arcuate slot 30 struck with the pivot 27 as its center. An adjustable clamping bolt 31 carried by the lug 32 on the frame 17 provides a means for holding the bracket 26 in adjusted position.

It will be noted that the wheel 18 with its mounting means and the motor 19 are mounted on opposite sides of the pivot 16 of the frame 17, and therefore these elements counterbalance each other so that, in swinging the frame to move the wheel to and from the work, very little effort is required. Preferably the motor should overbalance the wheel somewhat so as to retain the wheel in the upright position—that is, away from the work between cutting operations. An adjustable limit stop is carried by the frame 17 to limit downward movement of the wheel to prevent its being shifted further than necessary for severing the particular section being cut. In the construction shown, this comprises a rod 33 threaded into a lug 34 on the frame and having a crank handle 35 whereby it may be adjusted. At its lower end it is adapted to engage an upwardly extending stop wall 36 carried by the container 10 to limit downward movement of the wheel. The frame 17 may be rocked on its pivot to shift the wheel to and from the work by any suitable handle 17*a* adjustably secured to the frame at 17*b*.

The wheel is preferably enclosed in a suitable safety guard so that, should it break, there will be no flying pieces to injure the operator. This guard is illustrated as a sheet metal member 42 extending over and enclosing the wheel and including an enclosing wall 43 on one side. On its opposite side it has an opening 44 of sufficient diameter to permit insertion and removal of the wheel for application to and removal from the driving shaft 20. After the wheel is applied, this opening is closed by a coverplate 45, preferably detachably secured in position by any suitable means. The rear wall 43 is provided with an arcuate slot 47 through which the shaft 20 extends and permits up and down movement of the wheel. The guard may be mounted by any suitable means.

As the wheel 18 during the cutting operation rotates, it will be evident that it tends to carry any liquid that it may pick up into the guard. To prevent this a stripper plate 48 is provided, this stripper plate extending laterally on opposite sides of the rear portion of the wheel. This plate may be mounted on the guard as indicated at 49 and may comprise a single plate 48 with a narrow slot which affords just sufficient clearance to permit the wheel to rotate. This plate effectively strips from the wheel any liquid that may be carried upwardly with it. Of course, the material to be cut must be held in the proper position in the container. Satisfactory means for doing this may comprise the supporting blocks 52 and 53 separated by a narrow space 54 to permit the abrasive wheel 18 to pass between them. These blocks have properly shaped notches 55 to receive the work, which, in the drawings indicated, consists of a tube 13. These notches may be of various shapes, but they are preferably tapered so that the work is firmly held. Of course, certain sections would be more stable in other shapes than V-notches, and, consequently, for particular jobs the shape of the notches would be adapted accordingly. Manually operated means are also provided for clamping or holding the work in these supporting blocks. In the present instance this clamping means comprises a lever 56 pivoted at 57 to lugs 58 on the forward wall of the container 10, and this lever includes a pair of spaced arms 59 and 60 extending at their free ends over the blocks 52 and 53. They are spaced sufficiently to permit the wheel 18 to pass between them, and these arms, with the blocks 52 and 53, provide means for clamping and holding the work on both sides of the wheel. The handle 61 permits lifting of the arms 59 and 60 to release the work and also to control the movement of the arms 59 and 60 to the work holding position. It has been found advisable, however, when certain materials and shapes are being cut, to provide yielding resilient means for holding these clamps against the work. Thus the lever 56 is provided with an arm 62 carrying adjustable screw 63 threaded in the arm and engaging the end of a slidable block 64 mounted in a recess in the container 10. In this recess is a spring 65 which tends to force the block 64 out against the screw 63 and to clamp the arms 59 and 60 down on the work. After adjustment, the screw 63 may be locked in adjusted position by lock-nut 66, and it will be evident that, with this construction, the tension of the spring may be adjusted, and, as a consequence, the pressure of the clamp on the work.

It has been found that in cutting glass tubes and particularly thin wall glass tubes, they should not be clamped too firmly. This adjustment of the pressure of the spring 65 is very effective in securing a proper yielding resilient pressure. It also seems advisable to have yielding resilient pads to contact with the work especially when glass tubes are being cut, and we further use such pads 67 preferably of live rubber or similar material.

To the container 10 there is also affixed a block 68 provided with a passage 69 having a curvature slightly greater than that of the wheel and located with its center of curvature approximately in the axis of rotation of the wheel at the average position of the latter when cutting through a section—that is to say, the center of curvature of the conduit would ordinarily be in the axis of rotation of the wheel when the latter had about half cut through the average section that the machine is designed to operate upon. The walls of the passage 69, it will be noted, are partially composed of the flanges 70 on either side of the wheel, these flanges extending toward each other to such an extent that the wheel is rotating practically in a very narrow slot.

A source of water supply such as the pipe 71 leads to the passage 69, and water—or for that matter—any liquid desired, may be led to the passage 69, whence it will flow down the passage and into the container, whence it may be run off to a waste pipe or circulated by a pump for repeated use, if desired.

In using the machine, the material—which for purposes of illustration may consist of the glass tube 13—is laid in the V-shaped notches 55 of the blocks 52 and 53 and clamped therein by bringing the pads 67 down upon it. With the wheel rotating in a counterclockwise direction, as viewed in Fig. 1—that is, in a direction to carry down the conduit water led in through the pipe 71, the wheel is brought down by manipulating the handle 17a and the desired cut made. It is important that the conduit 69 be so constructed that the stream of water emerging from it shall impinge on an area which includes the point of entrance of the wheel into the cut, this region being sufficiently large to always include that point as the cutting progresses. Of course, it is obvious that for several reasons it is desirable that the wheel run in a fixed plane in order that lengths of uniform thickness may be cut from rods, bars, sheets, and the like, and, furthermore, to avoid breakage. It is therefore important that the cross-section area of the conduit be symmetrically designed with respect to the plane of the wheel so that the pressure on both sides of the wheel will balance, since we have discovered that wheels of the gauge thickness that we employ are, when rotating at high speeds, easily deflected sidewise by very slight unbalanced pressures on their respective faces. The velocity of the water or other liquid supplied to the entrance end of the conduit need not be high since it derives a very high velocity by the centrifugal force imparted by the rapidly revolving wheel, the speed of which would vary from 1200 to 2500 revolutions per minute, depending upon the length of the cut and the nature of the material being cut. The volume of the stream should, however, be sufficiently large so that the region covering and surrounding the cut is virtually immersed in the liquid.

We claim:

1. In an abrasive cutting machine, means for clamping the material to be cut, a thin abrasive wheel, a frame on which the said wheel is rotatably mounted, the said frame being pivotally mounted to permit it to tilt and to move the wheel bodily in its plane of rotation, and a member provided with an arcual conduit for liquid mounted in the plane of rotation of the wheel and approximately concentric therewith, said conduit being provided with a narrow slot through which the edge of the wheel may, when tilted, extend into the conduit and rotate therein, said conduit being symmetrical with respect to the plane of travel of the wheel therein.

2. In an abrasive cutting machine, means for clamping the material to be cut, a thin abrasive wheel, a frame on which the said wheel is rotatably mounted, the said frame being pivotally mounted to permit it to tilt and to move the wheel bodily in its plane of rotation, and a member provided with an arcual conduit for liquid mounted in the plane of rotation of the wheel and positioned to discharge liquid to the cutting region, said conduit being provided with a narrow slot through which the edge of the wheel may, when tilted, extend into the conduit and rotate therein.

3. In an abrasive cutting machine, means for clamping the material to be cut, a thin abrasive wheel, a frame on which the said wheel is rotatably mounted, the said frame being pivotally mounted to permit it to tilt and to move the wheel bodily in its plane of rotation, and a member provided with an arcual conduit for liquid mounted in the plane of rotation of the wheel and approximately concentric therewith, said conduit being provided with a narrow slot through which the edge of the wheel may, when tilted, extend into the conduit and rotate therein.

4. In an abrasive cutting machine, means for clamping the material to be cut, a thin abrasive wheel, a frame on which the said wheel is rotatably mounted, the said frame being pivotally mounted to permit it to tilt and to move the wheel bodily in its plane of rotation, and a member provided with an arcual conduit for liquid mounted in the plane of rotation of the wheel and approximately concentric therewith, said conduit being provided with a slot through which the edge of the wheel may, when tilted, extend into the conduit and rotate therein, said conduit being symmetrical with respect to the plane of travel of the wheel therein.

5. In an abrasive cutting machine, means for clamping the material to be cut, a thin abrasive wheel, a frame on which the said wheel is rotatably mounted, the said frame being pivotally mounted to permit it to tilt and to move the wheel bodily in its plane of rotation, and a member provided with a conduit for liquid mounted in the plane of rotation of the wheel and positioned to discharge liquid to the cutting region, said conduit being provided with a narrow slot through which the edge of the wheel may extend into the conduit and rotate therein.

6. In an abrasive cutting machine, means for clamping the material to be cut, a thin abrasive wheel, a frame on which the said wheel is rotatably mounted, the said frame being pivotally mounted to permit it to tilt and to move the wheel bodily in its plane of rotation, and a member provided with a conduit for liquid mounted in the plane of rotation of the wheel and positioned to discharge liquid to the cutting region, said conduit being provided with a slot through which the edge of the wheel may extend into the conduit and rotate therein.

7. In an abrasive cutting machine, means for clamping the material to be cut, a thin abrasive wheel, a frame on which the said wheel is rotatably mounted, the said frame being pivotally mounted to permit it to tilt and to move the wheel bodily in its plane of rotation, and a member provided with a arcual conduit for liquid mounted in the plane of rotation of the wheel and positioned to discharge liquid to the cutting region, said conduit being provided with a slot through which the edge of the wheel may, when tilted, extend into the conduit and rotate therein.

8. In an abrasive cutting machine, means for clamping the material to be cut, a thin abrasive wheel, a frame on which the said wheel is rotatably mounted, the said frame being pivotally mounted to permit it to tilt and to move the wheel bodily in its plane of rotation, and a member provided with an arcual conduit for liquid mounted in the plane of rotation of the wheel and approximately concentric therewith, said conduit being provided with a narrow slot through which the edge of the wheel may extend into the conduit and rotate therein, said conduit being symmetrical with respect to the plane of travel of the wheel therein.

9. In an abrasive cutting machine, means for clamping the material to be cut, a thin abrasive wheel, a frame on which the said wheel is rotatably mounted, the said frame being pivotally mounted to permit it to tilt and to move the wheel bodily in its plane of rotation, and a member provided with an arcual conduit for liquid mounted in the plane of rotation of the wheel and approximately concentric therewith, said conduit being provided with a slot through which the edge of the wheel may extend into the conduit and rotate therein, said conduit being symmetrical with respect to the plane of travel of the wheel therein.

DARTREY LEWIS.
WILFRID L. WALSH.
WALTER B. LASHAR, JR.